Patented Dec. 5, 1933

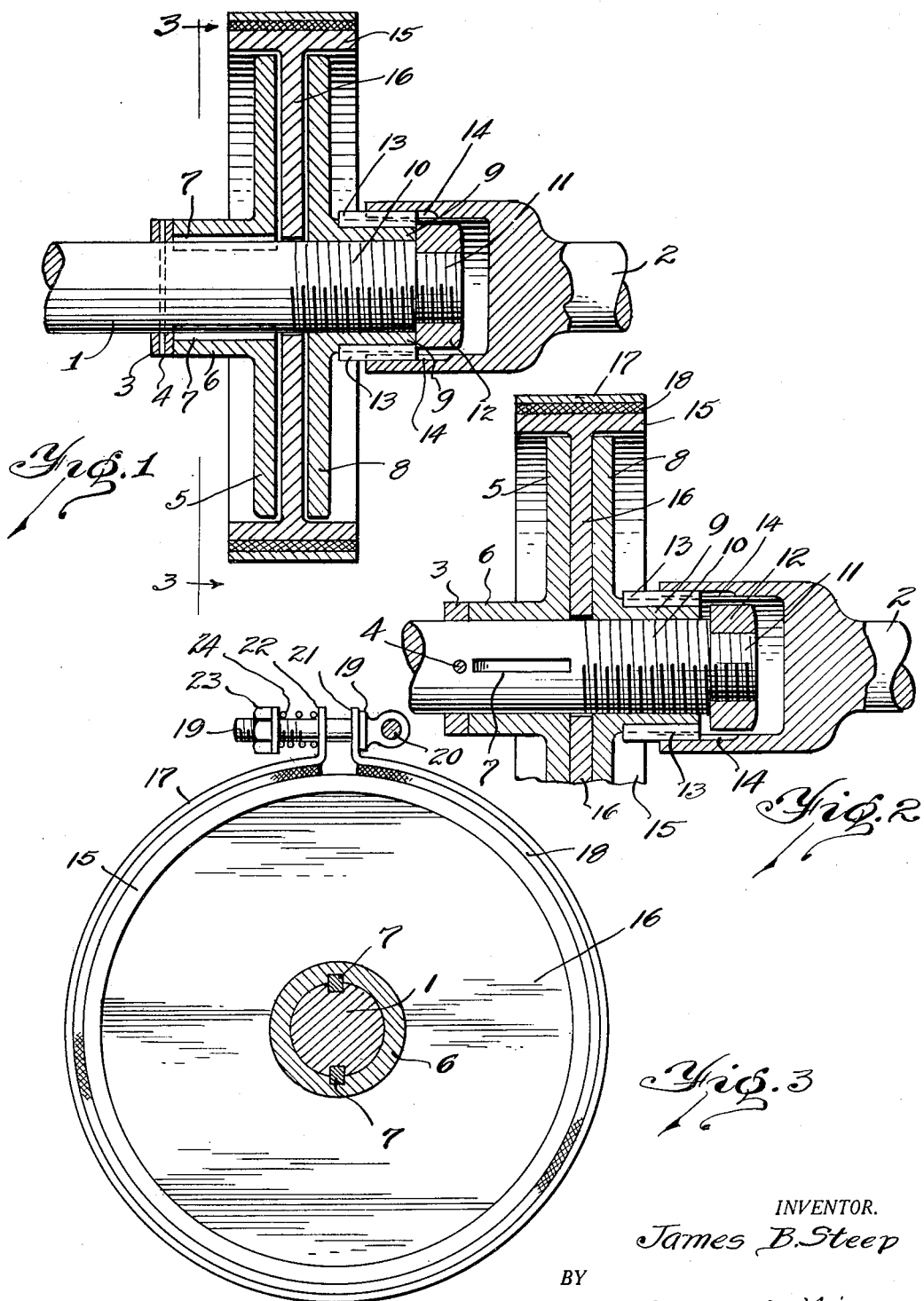

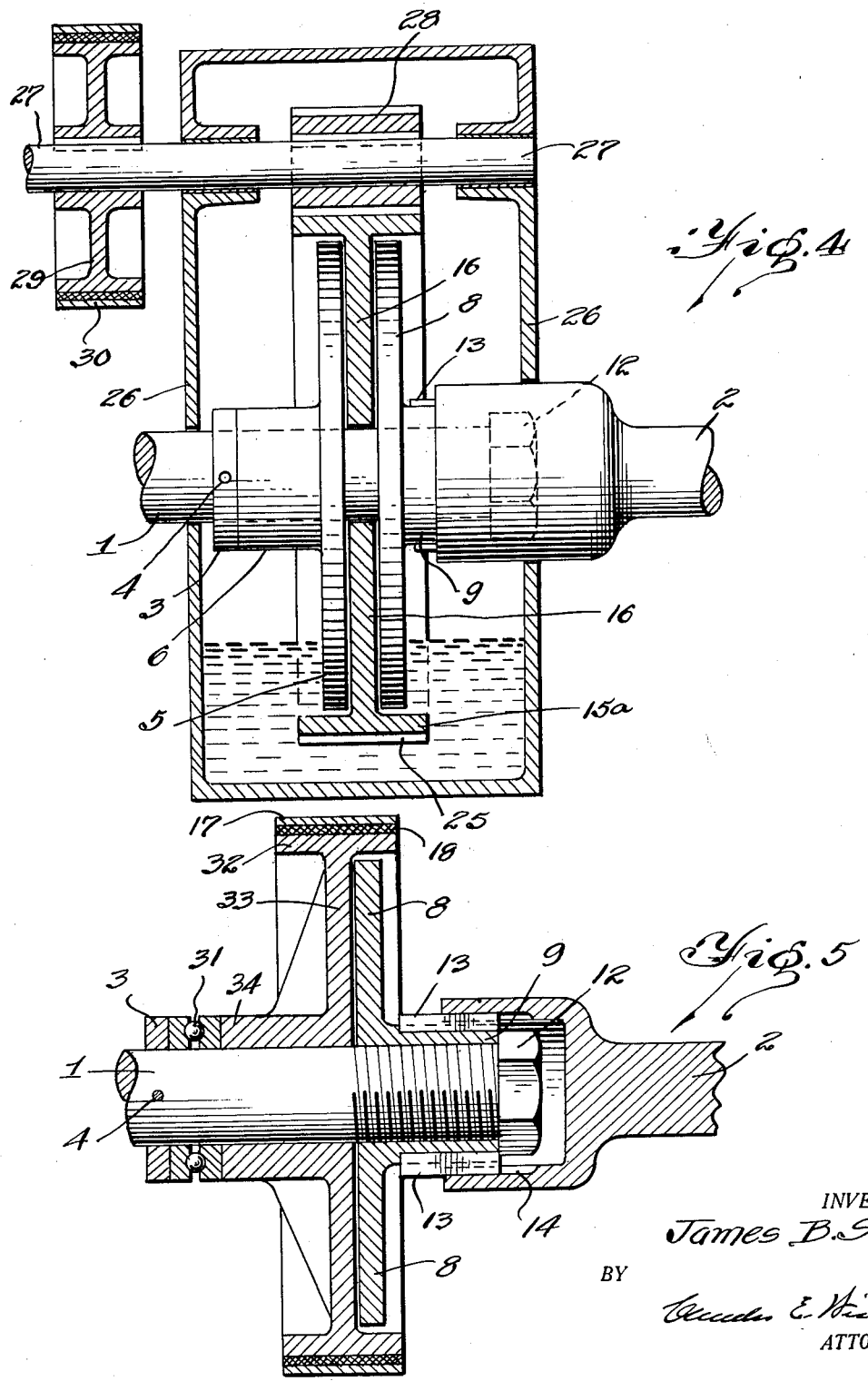

1,937,992

UNITED STATES PATENT OFFICE 1,937,992

AUTOMATIC COASTING BRAKE

James B. Steep, Detroit, Mich.

Application January 7, 1929. Serial No. 330,887

4 Claims. (Cl. 188—110)

This invention relates to automatic coasting brakes and the object of the invention is to provide a device for an automobile arranged to prevent the propeller or drive shaft from running faster than the throttle speed of the engine shaft.

A further object of the invention is to provide a brake so that when the automobile begins to coast and through the propeller shaft tends to drive the engine faster than its throttle speed a brake is applied to reduce the speed of the automobile to the throttle speed of the engine.

A further object of the invention is to provide a brake which is only applied when the speed of the propeller shaft becomes greater than the speed of rotation of the engine shaft and which is disengaged under normal operating conditions.

These objects and the several novel features of the invention are hereinafter more fully described and claimed and the preferred form of construction by which these objects are attained is shown in the accompanying drawings in which—

Fig. 1 is a longitudinal section through an automobile coasting brake in the disengaged position.

Fig. 2 is a section showing the brake engaged.

Fig. 3 is a section taken on line 3—3 of Fig. 1.

Fig. 4 is a section through an alternative form of the device.

Fig. 5 is a section through another alternative form of the device.

The device is connected between the engine shaft 1 and the propeller shaft 2 which drives the rear wheels of the automobile. A thrust collar 3 is secured to the shaft 1 by the pin 4 and a disc 5 having a hub 6 is secured to the engine shaft by means of the two diametrically opposite keys 7 shown in Figs. 1 and 3. A second disc 8 is provided having a hub 9 which is threaded onto the threaded end 10 of the engine shaft as shown and the engine shaft is also provided with a smaller threaded end 11 onto which a nut 12 is threaded. This nut 12 engages the end of the hub 9 and prevents the hub and disc 8 from being unthreaded from the end of the engine shaft. The hub 9 is provided with splines 13 and the end of the propeller shaft is cup shaped in form and is provided with grooves 14 fitting over the splines 13. By this arrangement the disc 8 is secured to rotate with the propeller shaft while the disc 5 is secured by means of the keys 7 to rotate with the engine shaft. A brake drum 15 is provided, shown in Figs. 1 and 3, having a flange 16 which extends between the two discs 5 and 8. This flange is provided with an aperture at the center slightly larger than the diameter of the engine shaft 1 so that the brake drum may remain stationary while the engine shaft and discs 5 and 8 are rotated.

As shown in Fig. 3 a brake band 17 is provided about the brake drum 15 and a brake lining 18 is secured to the band 17 and engages the face of the brake drum 15. A bolt 19 is provided which is secured to a rod or bolt 20 preferably attached to some stationary part of the automobile such as the transmission housing or automobile frame. This bolt 19 extends through an aperture provided in the end 21 of the brake band and also extends through the end 22 of the brake band and is provided with a nut 23 as shown in Fig. 3. A coiled spring 24 is positioned on the bolt 19 between the nut 23 and the end 22 of the brake band and by this arrangement a constant pressure is applied to the brake drum 15 and the pressure is adjustable by adjusting the nut 23. As the bolt 19 is held stationary the brake band is held therewith and the brake drum which it engages is yieldably rotatable therein.

Assuming that the engine shaft in Fig. 3 rotates in a counter clockwise direction it will be seen from Fig. 1 that the shaft will tend to thread itself out of the hub 9 of the disc 8. This seats the hub 9 firmly against the nut 12 and causes the engine shaft by means of the splined hub to drive the propeller shaft. Upon reduction of the speed of rotation of the engine shaft below the speed of rotation of the propeller shaft the propeller shaft having greater speed tends to rotate the disc 8 and threads it up on the engine shaft. This moves the disc 8 into contact with the flange 16 of the brake drum and also moves this flange into engagement with the disc 5 which is secured to the engine shaft as shown in Fig. 2.

By this arrangement the brake drum 15 is held between the discs 5 and 8 and is rotated therewith and this rotation is yieldably resisted by the brake band to reduce the speed of the propeller shaft to the throttle speed of the engine shaft. In other words as soon as the two discs 5 and 8 engage the brake drum flange 16 the engine shaft and propeller shaft are rotated at the same speed and the brake band decreases this speed to the throttle speed of the engine. As soon as the throttle speed of the engine increases the rotation of the engine shaft 1 beyond that of the propeller shaft the engine shaft tends to unthread itself from the hub of the disc 8 thus returning the parts to the normal operating position shown in Fig. 1.

In Fig. 4 an alternative form of the device is shown in which the brake drum 15a is provided with gear teeth 25 in its outer periphery. In this case a housing 26 is provided and a counter shaft 27 is rotatably mounted in the housing and is provided with a gear 28 keyed thereto which meshes with the teeth 25 of the drum 15a. In this form a separate brake drum 29 is secured to the outer end of the shaft 27 and the brake band 30 is mounted on the drum 29. This arrangement provides a means for controlling the device at some distance from the mechanism.

A simpler form of the device is shown in Fig. 5 and consists of a ball thrust bearing 31 seating against the thrust collar 3 and in this case the brake drum 32 is provided with a flange 33 and a hub 34 which is not keyed to the engine shaft 1 but is rotatable thereon. This brake drum 32 is held in substantially stationary position by means of the brake band 17 which is the same as that shown in Fig. 3.

In this form the engine shaft 1 normally tends to unthread itself from the hub of the disc 8 thus seating this hub against the nut 12 and driving the propeller shaft 2 through the hub 9. Should the propeller shaft increase in speed over that of the engine shaft it will thread the disc 8 up onto the engine shaft into engagement with the portion 33 of the brake drum 32. As rotation of this brake drum is resisted by the brake band the rotation of the propeller shaft is immediately reduced to that of the throttle speed of the engine so that the engine shaft again tends to unthread itself from the hub of the disc 8 thus disengaging the disc 8 from the brake drum and driving the propeller shaft through the hub 9. This is the simplest form of the device and it will be noted that all forms will maintain the speed of rotation of the propeller shaft at the throttle speed of the engine. In use, the instant that the driver removes his foot from the throttle, the brake is applied to the propeller shaft thus holding the automobile down to the throttle speed of the engine.

Also in coasting down hills the same effect will be noted that upon sudden reduction in throttle speed the speed of the automobile is proportionately reduced. Obvious changes in the construction of the drum and contacting disks and other structural characteristics may be made without departing from the spirit of this invention as set forth in the appended claims.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. In a device of the character described, a drive shaft having a threaded end, a driven shaft having an internally grooved cup shaped end, a disc having a hub threaded onto the drive shaft, the hub being externally splined and the grooved cup shaped end of the driven shaft engaging the said splines, a second disc having a hub secured to the drive shaft in spaced relation with the first named disc, a member having a flange extending between the two discs, means resisting rotation of the said member, and means limiting unthreading of the first named disc from the drive shaft.

2. In a device of the character described, a drive shaft, a longitudinally aligned driven shaft, a disc threaded on the drive shaft to permit movement longitudinally thereof through relative rotation and slidably connected to and rotatable with the driven shaft, a second disc secured to the drive shaft, a rotatably supported brake drum having a flange extending between the two discs, a brake band yieldably resisting rotation of the brake drum, the arrangement being such that upon rotation of the driven shaft faster than the drive shaft the first named disc is threaded onto the drive shaft to engage the flange of the brake drum between the discs.

3. In a device of the character described, a drive shaft, a longitudinally aligned driven shaft in axial alignment therewith, a disc threaded on the drive shaft to permit movement longitudinally thereof through relative rotation and slidably connected to and rotatable with the driven shaft, a disc connected to rotate with the drive shaft, a rotatable member having a flange extending between the said discs, means yieldably resisting rotation of the said member, and means for engaging the flange of the said member between the said discs upon rotation of the driven shaft faster than the drive shaft.

4. In a device of the character described, a drive shaft, a driven shaft in axial alignment therewith, a disc threaded on the drive shaft to permit movement longitudinally thereof through relative rotation and slidably connected to and rotatable with the driven shaft, means preventing removal of the said disc from the drive shaft, a rotatably supported second disc adapted to be engaged by the first disc, and means for resisting rotation of the second disc.

JAMES B. STEEP.